United States Patent [19]

Suzuki et al.

[11] Patent Number: 4,800,444
[45] Date of Patent: Jan. 24, 1989

[54] IMAGE SCANNER

[75] Inventors: Motoyuki Suzuki; Kazuo Kikuchi, both of Miyagi, Japan

[73] Assignee: Alps Electric Co., Ltd., Japan

[21] Appl. No.: 944,810

[22] Filed: Dec. 19, 1986

[30] Foreign Application Priority Data

Feb. 5, 1986 [JP] Japan .................... 61-14506[U]

[51] Int. Cl.$^4$ ............................. H04N 1/024
[52] U.S. Cl. ........................ 358/294; 382/59
[58] Field of Search ............ 358/293, 294, 256; 382/59; 250/576

[56] References Cited

U.S. PATENT DOCUMENTS 4,061,380 12/1977 Carnahan .................... 353/59

Primary Examiner—Edward L. Coles, Sr.
Attorney, Agent, or Firm—Guy W. Shoup; Paul J. Winters; Stephen L. Malaska

[57] ABSTRACT

An image scanner, in one of a system in which reading of data is performed by shifting a case with an image sensor incorporated therein relative to the surface of a fixed original, is disclosed comprising a window provided on the case for enabling the operator to make visual observation of data being read. The window is provided put therein with a member of frosted glass or the like capable of forming an image thereon, whereby the image of the data being read is adapted to be formed on this member.

3 Claims, 2 Drawing Sheets

IMAGE SCANNER

BACKGROUND OF THE INVENTION

1. Field of the Invention

The present invention relates to an image scanner and more particularly to an image scanner adapted such that the data such as characters and symbols being input thereto are allowed to be monitored from outside the apparatus.

2. Description of Prior Art

An image scanner is used as an input means of data for outputting such data as characters and patterns described in a data source (an original) as a CRT display or in a hard copy. The image scanners are broadly classified, according to their manners of scanning, into two groups: one group of the system in which the original is shifted while data entry therefrom is made; and the other group of the system in which the original is fixed and the image scanner is shifted during the data entry. While those of the system in which the image scanner is shifted for the data entry are generally arranged such that the image scanner portion and the portion for processing the data received from the scanner portion are an integrated body, there is recently proposed a type of the same system, called a handy type, which is arranged such that the image scanner portion is separated from the main body and this image scanner is shifted by the operator held in his hand.

When inputting data by operating the image scanner, it will be convenient if the data being input are visually observed simultaneously. Specifically when the handy type image scanner is used, since the piece of data to be input is a portion of the original in many cases, the handiness of the apparatus greatly depends on whether or not the data being input can be visually observed.

As described above, when using the image scanner, specifically, of the handy type, the scanning operation is liable to become unstable in keeping the scanning direction since the original is scanned by hand. Hence, it is not always sure that desired data can be obtained. Therefore, if it is made possible to monitor the data being input on a real-time basis, the reliability on the image scanner, specifically, of the handy type is expected to be greatly improved.

SUMMARY OF THE INVENTION

The present invention has been made in view of the above described problem, or demand, and it is therefore a primary object of the invention to provide an image scanner, in the apparatus of the system in which the scanning portion (image scanner) incorporating an image sensor unit therein is shifted with reference to a fixed original, comprising provided thereon a data display portion enabling the operator to visually observe the data as the object of reading (data inputting), from outside the image scanner.

In accordance with the present invention, as described above, the data display portion is provided on the image scanner enabling the operator to visually observe from outside the same the data as the object of reading (data inputting), and therefore, accurate reading thereof is assured, and, specifically, when applied to that of the handy type, the accurate reading of only the wanted portion in the original is achieved.

DESCRIPTION OF THE PREFERRED EMBODIMENT

A preferred embodiment of the present invention will be concretely described in the following.

Figure 1:
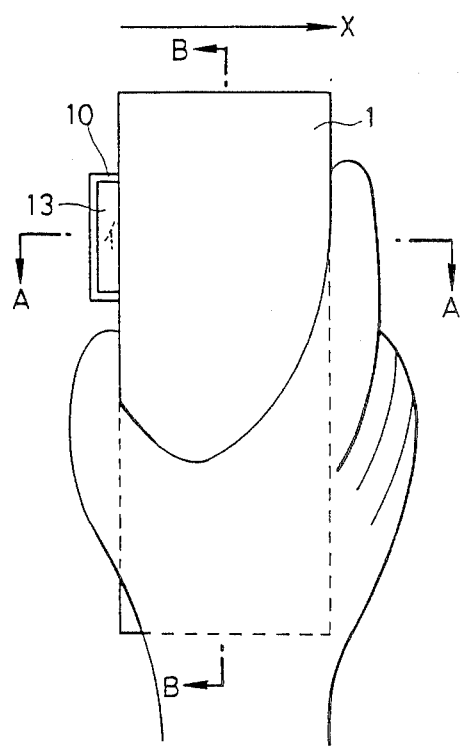
FIG. 1 is an apparatus plan view showing the apparatus of an embodiment of the invention in an operated state.
Figure 2:
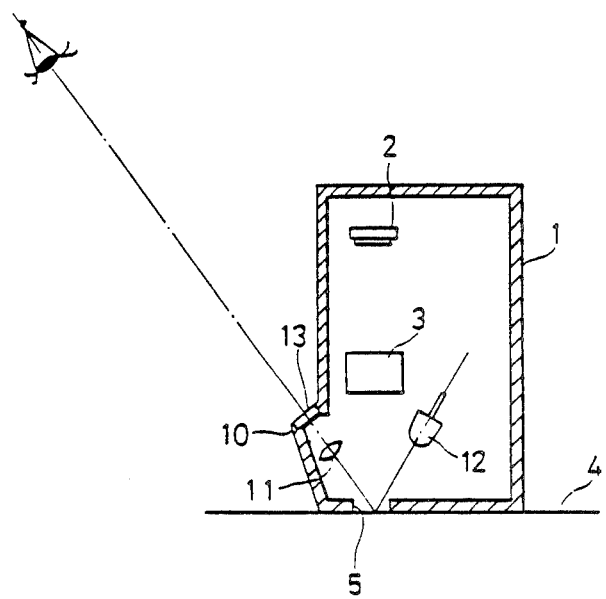
FIG. 2 is a cross-sectional view taken along line A—A of FIG. 1.
Figure 3:
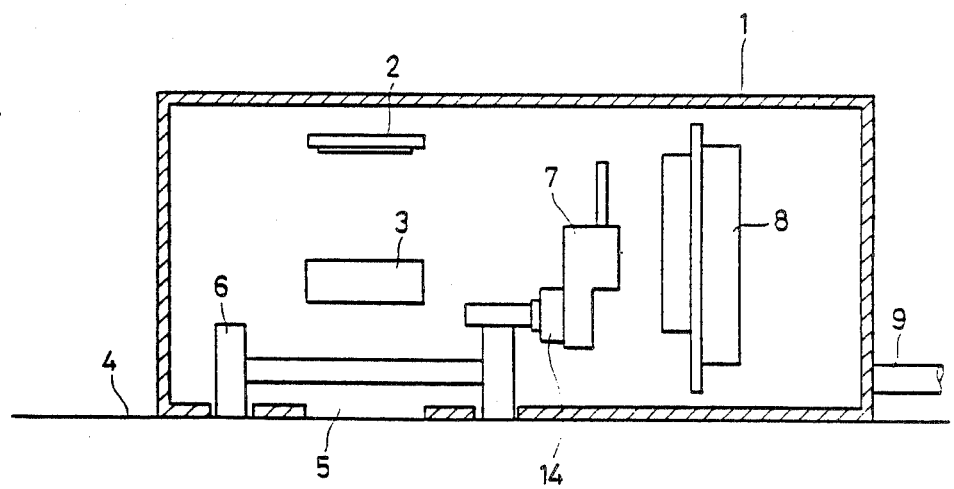
FIG. 3 is a cross-sectional view taken along line B—B of the same.

FIG. 1 is an apparatus plan view showing the apparatus of the invention in an operated state, FIG. 2 is a cross-sectional view taken along line A—A of FIG. 1, and FIG. 3 is a cross-sectional view taken along line B—B of the same.

Referring to the drawings, reference numeral 1 denotes a case as the main body of the image scanner, 2 denotes an image sensor disposed within the main body, 3 denotes a lens for image formation of data described in an original 4, and 5 denotes an opening (window) for reading data therethrough.

Then, 6 denotes a roller for detecting travel, 7 denotes a sensor for detecting travel including an encoder 14 or the like connected with the roller, 8 denotes a primary data processing circuit, and 9 denotes a cord for outputting a signal of primarily processed data to a data processing unit constituted of a microcomputer or the like.

Referring to FIG. 2, 10 denotes a window provided on a side wall portion of the case 1 for monitoring the data being read. As to this window 10, the minimum function thereof may be achieved just by an opening made in the side wall, but it is preferable that a window closing member 13 of glass or the like is put therein so that such things as dust are prevented from entering the apparatus from outside. Further, if the window closing member 13 is formed of a member of frosted glass or the like capable of forming an image thereon, it becomes possible, by disposing a convex lens 11 for image formation, to make an image of the data of the original 4 as the object of reading can be formed on the window closing member. On the other hand, if only an opening is made there, not only dust and the like enter from outside as described above, but there also is possibility of external light entering and making the reading of data difficult partly or causing erroneous reading. If the member of frosted glass is used, the greatest effect is obtained since entrance from outside of both dust and light can be blocked. Then, 12 denotes a light source constituted of a light emitting diode (LED) or the like for illuminating the portion of the original 4 just subjected to reading. But, by utilizing a portion of the illumination so that the image of the data may be formed on the window closing member 13 through the convex lens 11, the operator of the apparatus is enabled to easily monitor the data being read.

Operations of the apparatus of the above described structure will be described taking an arrangement with a member of frosted glass put in the opening portion as an example.

In reading data with the apparatus, the operator holds the case 1 in his hand and put this case 1 in place on an original 4. At this time, the operator can easily confirm whether or not the case 1 is correctly placed in the starting position for reading through visual observation of the image of the data formed on the member of frosted glass. Upon confirmation of the case 1 placed in right position, the operator shifts the case 1 in the direction of X as shown in FIG. 1. And thereby, the data are input through the opening 5 made in the bottom plate of the case 1 and the image forming lens 3 to the image sensor 2, when the image sensor 2 itself also makes a scanning in the lateral direction of the opening (in the direction perpendicular to the travel of the case) to make entry of data. While the case is shifted, since the image of the data input to the image sensor 2 are simultaneously formed on the member of frosted glass, whether right data are being correctly input or not can be determined on a real-time basis by monitoring the data whose image is formed on the member of frosted glass. To the primary information processing circuit 8, a signal output from the image sensor 2 and a signal of the travel sensed by the sensor for detecting travel 7 in conjunction with the roller for detecting travel 6 are both input. These signals are subjected to primary processing in the primary data processing circuit 8 and then output through the cord 9 to the data processing unit (not shown) constituted of a microcomputer or the like, whereby the read data are displayed in a predetermined manner as a CRT display or in a hard copy.

As described so far, since the apparatus of the present invention comprises a display portion enabling the operator to monitor the data being read provided on the case as the main body thereof, it is made possible to monitor the data to be read even if the portion to be read is covered by the main body of the apparatus, and thus, reliability on the apparatus can be greatly improved.

What is claimed is:

1. An image scanning system for reading by an operator of data registered on the surface of a fixed original comprising:
    an image sensor;
    a case for containing said image sensor, said case having a side wall and a connecting bottom portion;
    an opening in said bottom portion for providing access for reading data on said surface of said fixed original;
    a window formed in a portion of said side wall closely spaced from said opening for monitoring data being read, said window having a member on which an image is formed; and
    means disposed within said case for directing an image of the data being read from said fixed original to said window in said side wall for viewing by said operator.

2. An image scanning system as in claim 1, wherein said member comprises frosted glass.

3. An image scanning system according to claim 1, wherein a light source for illuminating said opening made in the bottom plate of the case for reading the data therethrough and a lens for converging the illumination by said light source on the surface of the original are provided within the case, and wherein it is adapted such that an image of the data is formed through said lens on said window surface so that the same may be visually observed for monitoring.

* * * * *